United States Patent

[11] 3,581,230

[72] Inventor David C. Smith
Glastonbury, Conn.
[21] Appl. No. 793,945
[22] Filed Jan. 27, 1969
[45] Patented May 25, 1971
[73] Assignee United Aircraft Corporation
East Hartford, Conn.

[54] PASSIVE Q-SWITCH AND MODULATOR FOR $CO_2$ LASERS
5 Claims, 1 Drawing Fig.

[52] U.S. Cl. .................................................. 331/94.5
[51] Int. Cl. ....................................................... H01s 3/10,
H01s 3/22, H01s 3/11
[50] Field of Search............................................. 331/94.5

[56] References Cited
UNITED STATES PATENTS
3,281,713 10/1966 Soules ......................... 331/94.5
3,321,714 5/1967 Tien ............................. 331/94.5

OTHER REFERENCES

Hanst, " Repetitive Pulsing of the $CO_2$ Laser by means of $CO_2$ Gas and other Absorbers" App. Phys. Lett. 12, (3), Feb. 1, 1968. pps. 58— 61

Karlov, " Q-Switching of a $CO_2$ Laser with a Saturating Filter Based on $BCL_3$ " JETP Letters, 1, (5), March 5, 1968

Primary Examiner—Ronald L. Wibert
Assistant Examiner—R. J. Webster
Attorney—Donald F. Bradley ABSTRACT: A cell containing a gaseous bleachable dye is positioned in the optical feedback cavity of a carbon dioxide laser to Q-switch the laser. An acoustic wave generated through the gas will cause the output of the laser to be modulated at the acoustic frequency.

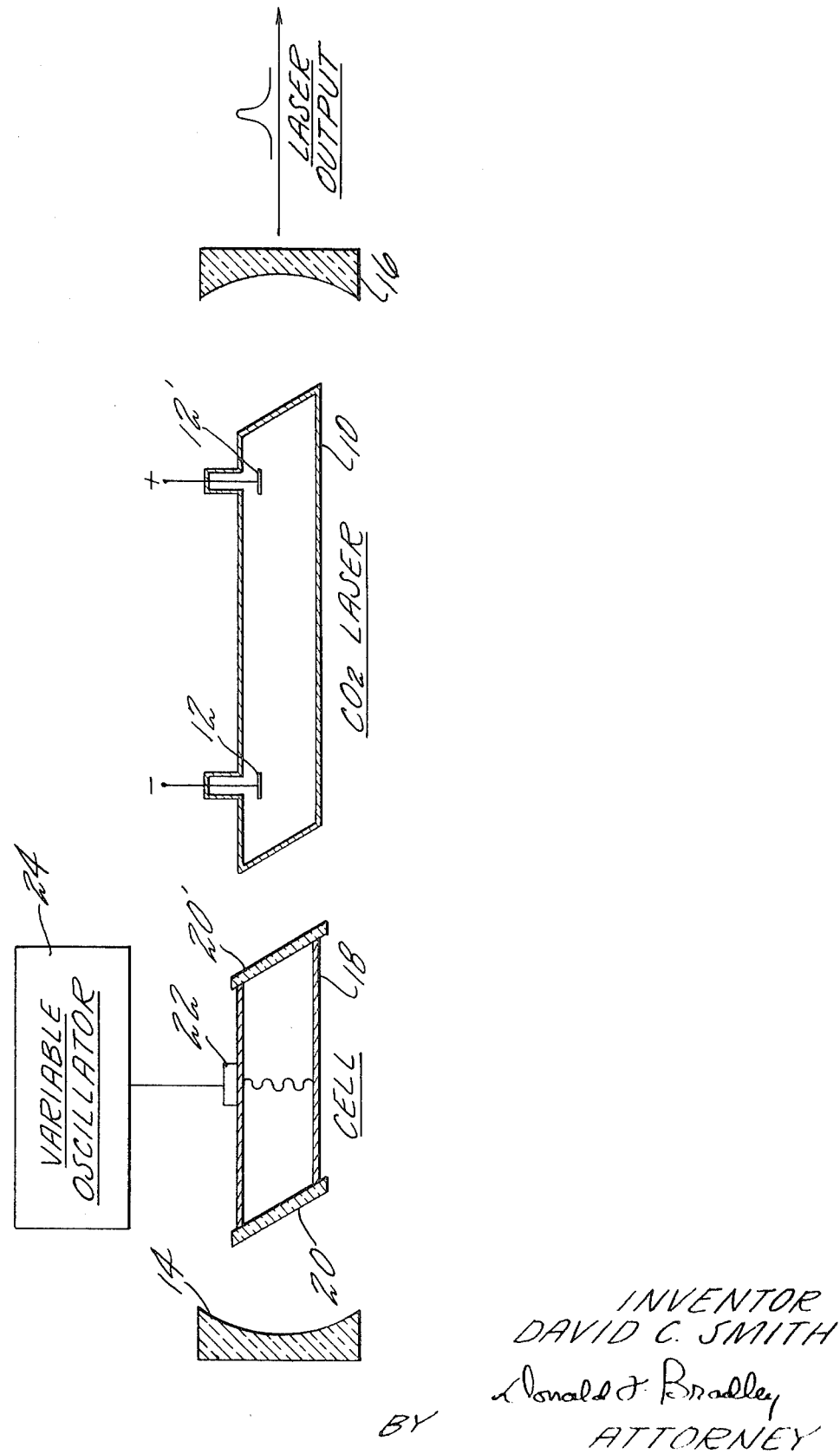

PASSIVE Q-SWITCH AND MODULATOR FOR CO₂ LASERS

BACKGROUND OF THE INVENTION

1. Field of the Invention

This invention relates to carbon dioxide lasers, and in particular to apparatus for Q-switching and modulating a carbon dioxide laser whose output radiation is in the infrared spectrum in the range of 10 microns wavelength.

In particular, this invention relates to the use of a gaseous bleachable dye consisting preferably of a hydrocarbon compound for Q-switching a carbon dioxide laser in the range of 10 microns wavelength.

2. Description of the Prior Art

In order to obtain high peak powers from a laser, it is necessary to shutter or Q-switch the cavity. Without the shutter the inversion or stored laser energy will only grow to a value which is sufficient for the stimulated emission to balance the laser cavity losses and then the laser will oscillate. The shutter enables the population inversion to grow beyond this threshold and thereby produce a gain in the peak power obtainable from the laser when the shutter is opened. With optical frequency lasers such as ruby and neodymium, electro-optical shutters such as Kerr cells or Pockel cells, rotating mirrors, or saturable dyes have been used to Q-switch the lasers and produce high peak power pulses.

With the output of carbon dioxide lasers at about 10 microns, the electro-optical devices cannot be used because of the absorption of the radiation by the elements of the device. Until this invention, Q-switching of a carbon dioxide laser has been achieved only with a rotating mirror.

This invention overcomes the disadvantages of the prior art and utilizes an inexpensive and simple technique for Q-switching. Specifically, a saturable absorber in the form of a hydrocarbon or other suitable gaseous compound is contained in a cell internal to the laser cavity. The saturable absorber absorbs the radiation at the wavelength of the carbon dioxide emission and remains sufficiently opaque to prevent depletion of the inversion until the absorber is bleached, at which time a giant pulse of radiation is produced which depletes the inversion in a very short time.

SUMMARY OF THE INVENTION

A primary object of the present invention is a technique for Q-switching and modulating a carbon dioxide laser whose output radiation is in the infrared spectrum at between 9 and 11 microns wavelength.

In accordance with the present invention, an optical cell containing a gaseous bleachable dye consisting of a hydrocarbon or other suitable compound is positioned in the optical feedback cavity of a carbon dioxide laser. The gas is at a pressure of between 1 and 10 torr. When the laser medium is excited, the bleachable gas absorbs radiation at between 9 and 11 microns wavelength, and the gas which is initially opaque rapidly becomes transparent which is similar to the action of a shutter. A high peak power output pulse is produced from the laser cavity at the specific carbon dioxide line wavelength.

In accordance with a further aspect of the present invention, a gaseous bleachable dye consisting of a hydrocarbon or other suitable compound is positioned in an optical cell in the optical feedback cavity of a carbon dioxide laser as described above. An acoustic wave is generated through the gaseous medium to alter the refractive index of the gas. When the laser is excited, the pulses produced thereby are modulated at the acoustic frequency.

This invention thus allows Q-switching and modulation of a carbon dioxide laser at 10.6 microns wavelength.

BRIEF DESCRIPTION OF THE DRAWING

FIG. 1 shows schematically the positioning of an optical cell containing a gas in the optical feedback cavity of a carbon dioxide laser.

DESCRIPTION OF THE PREFERRED EMBODIMENT

It is known in the prior art that a saturable absorber positioned in the optical feedback cavity of an optical laser will produce passive Q-switching of the laser radiation. However, until this invention no material was available to provide Q-switching to the wavelengths of a carbon dioxide laser.

The active material of a passive Q-switch for most efficient operation must have a strong absorption at carbon dioxide wavelengths and must bleach sufficiently fast to produce a giant pulse of radiation energy. For Q-switching of optical frequency lasers, the passive material is a solid material or liquid solution. However, at about 10 microns wavelength, these materials are either transparent or will not meet the requirement of being a strong absorber with a rapid relaxation time.

For absorption of the long carbon dioxide wavelengths, the required absorption band characteristics occur in the vibrational levels of a molecule which is in the gaseous state. Specifically, propylene and propane have been found to be ideally suited to Q-switch a carbon dioxide laser at about 10 microns wavelength. Most hydrocarbon compounds as well as ammonia are strong absorbers in the infrared, and depending on the recovery time of the material these compounds are fast enough for carbon dioxide laser Q-switching.

Referring to FIG. 1, there is shown a typical laser tube 10 in which are positioned electrodes 12 and 12'. The tube 10 is typically filled with a mixture of carbon dioxide, nitrogen and helium gases.

An optical feedback cavity for the laser is provided by gold or dielectric coated mirrors 14 and 16. One of the mirrors is partially transparent in order to provide an output from the laser oscillator.

When an electrical discharge is produced between electrodes 12 and 12' by applying an electrical potential with polarities as shown in the FIGURE, a population inversion of molecules occurs inside the laser tube and lasing occurs. Other configurations for obtaining the population inversion of the carbon dioxide molecules may also be used.

In order to attain high peak powers, it is necessary to shutter or Q-switch the cavity. To this end an optical cell 18 is positioned within the optical feedback cavity of the laser. The cell 18 has end windows 20 and 20' which are transparent to radiation to wavelengths at about 10 microns. As is well known in the art, the windows may be made from sodium chloride.

The cell 18 is filled with a gaseous hydrocarbon compound such as propylene at a pressure of between 1 and 10 torr.

When the carbon dioxide laser is excited to produce pulses radiation, the propylene inside cell 18 absorbs radiation at about 10 microns wavelength and becomes transparent very rapidly. The gas acts as a shutter, and a high peak power pulse is produced.

In an experimental situation, the peak power of an output pulse from an electrical discharge carbon dioxide laser excited by a capacitor discharge was increased by a factor of three when propylene was introduced into the cell. In another experimental situation, a propylene cell used in conjunction with a rotating mirror and a DC excited laser produced reproducible Q-switched pulses with low mirror rotation rates, whereas without the propylene for the same mirror rotation, the Q-switched pulses were erratic and of longer duration.

The recovery time of the gaseous bleachable dye in the cell is determined by the pressure of the gas within the cell. Pulse repetition rates of between 10,000 and 1000,000 pulses per second may be obtained with various gases at selected pressures.

Other hydrocarbon gases may be used in cell 18 if their recovery time is sufficiently fast for the particular use desired. Ammonia is a strong absorber in the infrared, and may also be used. Heated carbon dioxide and Freon 11 will also Q-switch.

Modulation of the output from the carbon dioxide laser may be obtained by generating an acoustic wave through the gaseous medium to alter the refractive index of the gas. As shown in FIG. 1, a transducer 22 is mounted adjacent the cell 18, and a variable oscillator 24 is connected to the transducer 22. When the oscillator is actuated, transducer 22 generates acoustic waves within the gaseous medium inside 18. The acoustic wave alters the refractive index of the gas, and the output of the laser is modulated at the acoustic frequency. A lower concentration gas inside cell 18 is preferred for modulation to take place. Further, for modulation to occur it is necessary that the absorption be fast, and propylene and propane are the preferred gases.

The carbon dioxide infrared laser has an efficiency of operation and high CW power levels which make it attractive for use in radar ranging, welding and various other applications. The 10.6 micron wavelength is particularly useful. By the disclosed technique, Q-switching of the carbon dioxide laser further enhances the desirable characteristics of the carbon dioxide laser.

It is to be understood that the invention is not limited to the specific embodiment herein illustrated and described, but may be used in other ways without departing from its spirit as defined by the following claims.

I claim:

1. Apparatus for Q-switching a carbon dioxide laser at 10.6 microns wavelength comprising
    a carbon dioxide laser medium,
    an optical feedback cavity for said laser medium,
    and an optical cell positioned within said feedback cavity containing a gaseous bleachable dye absorbing at between 9 and 11 microns wavelength.
2. Apparatus as in claim 1 in which said gas is propylene.
3. Apparatus as in claim 1 in which said gas is propane.
4. Apparatus as in claim 1 in which said gas if Freon 11.
5. Apparatus as in claim 1 and including means to generate an acoustic wave within said optical cell to vary the refractive index of said gaseous bleachable dye and modulate the output from said laser medium at the frequency of said acoustic wave.